(12) United States Patent
Liu et al.

(10) Patent No.: US 9,330,038 B2
(45) Date of Patent: May 3, 2016

(54) COMPUTER ARBITRATION SYSTEM, BANDWIDTH, ALLOCATION APPARATUS, AND METHOD THEREOF

(71) Applicant: ASMedia Technology Inc., New Taipei (TW)

(72) Inventors: Yang-Chen Liu, New Taipei (TW); Hui-Yu Tang, New Taipei (TW); Li-Feng Kuo, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 374 days.

(21) Appl. No.: 14/106,869

(22) Filed: Dec. 16, 2013

(65) Prior Publication Data

US 2014/0189189 A1   Jul. 3, 2014

(30) Foreign Application Priority Data

Dec. 28, 2012   (CN) .......................... 2012 1 0586696

(51) Int. Cl.
*G06F 13/00* (2006.01)
*G06F 13/362* (2006.01)
*G06F 13/38* (2006.01)
*G06F 13/40* (2006.01)

(52) U.S. Cl.
CPC .......... *G06F 13/3625* (2013.01); *G06F 13/385* (2013.01); *G06F 13/4022* (2013.01)

(58) Field of Classification Search
CPC ........................... G06F 13/385; G06F 13/4022
See application file for complete search history.

(56) References Cited

U.S. PATENT DOCUMENTS

| | | | |
|---|---|---|---|
| 7,356,636 B2 | 4/2008 | Torudbakken et al. | |
| 7,996,591 B2 | 8/2011 | Xie et al. | |
| 2009/0150582 A1* | 6/2009 | Diefenbaugh | G06F 13/385 710/100 |
| 2010/0030925 A1* | 2/2010 | Inoue | G06F 3/1204 710/16 |
| 2011/0302357 A1 | 12/2011 | Sullivan | |
| 2014/0013024 A1* | 1/2014 | Lamm | H01R 27/02 710/313 |

* cited by examiner

*Primary Examiner* — Zachary K Huson
(74) *Attorney, Agent, or Firm* — CKC & Partners Co., Ltd.

(57) ABSTRACT

The bandwidth allocation apparatus includes a high bandwidth arbitration module, a low bandwidth arbitration module and a multiplexer. The high bandwidth arbitration module is used to select one downstream device from the high bandwidth downstream device group for allowing uplink. The low bandwidth arbitration module is used to select one downstream device from the low bandwidth downstream device group for allowing uplink. The multiplexer selects the one of the access requests from the high bandwidth arbitration module or the low bandwidth arbitration module for allowing to uplink the access request to an upstream device. The access transmission times of the high bandwidth arbitration module and the low bandwidth arbitration module are counted respectively by a counting circuit.

10 Claims, 3 Drawing Sheets

COMPUTER ARBITRATION SYSTEM, BANDWIDTH, ALLOCATION APPARATUS, AND METHOD THEREOF

CROSS-REFERENCE TO RELATED APPLICATION

This application claims the priority benefit of China application serial No. 201210586696.1, filed on Dec. 28, 2012. The entirety of the above-mentioned patent application is hereby incorporated by reference herein and made a part of specification.

BACKGROUND OF THE INVENTION

1. Field of the Invention

The disclosure relates to an interconnection filed and, more particularly, to a Peripheral Component Interconnect Express in the interconnection filed.

2. Description of the Related Art

In general, computer systems include a number of elements and components. These elements are coupled via a bus or other interconnection ways, such as by the multi-drop parallel bus architecture of the Peripheral Component Interconnect (PCI). Recently, a new generation of I/O bus is used to couple elements, such as a peripheral component interconnect express (PCIE), which makes the transmission among the serial physical layer protocol devices faster.

In the computer system, multiple downstream devices may share a data bus simultaneously, such as LAN, therefore it needs an arbitration mechanism to control the data flow on the bus and determine which downstream device is allowed to access and transmit data. The arbitration architecture often involves two trade-off factors which are fairness and efficiency. However, the arbitration architecture can ensure the fairness but makes the use of bus inefficiently.

If some downstream devices must complete the data transmission within a certain period an entirely fair arbitration mechanism may not allocate the bus access right in time such that the downstream device may occur a deadlock due to errors generating at the transmission. On the other hand, if some of the downstream devices unreasonably occupy bandwidth for a long time, the smoothness in transmitting packets of the entire computer system is affected.

BRIEF SUMMARY OF THE INVENTION

The bandwidth allocation apparatus is used to arbitrate multiple access requests from a plurality of downstream devices at an upstream direction, the downstream devices are classified into at least one high bandwidth downstream device group and at least one low bandwidth downstream device group according, to a transmission speed. The bandwidth allocation apparatus includes a high bandwidth arbitration module, a low bandwidth arbitration module and a multiplexer. The high bandwidth arbitration module is used to select one downstream device from the high bandwidth downstream device group for allowing uplink. The low bandwidth arbitration module is used to select one downstream device from the low bandwidth downstream device group for allowing uplink. The multiplexer selects one of the access requests from the high bandwidth arbitration module or the low bandwidth arbitration module for allowing to uplinks the access request to an upstream device. The access transmission times of the high bandwidth arbitration module and the low bandwidth arbitration module are counted respectively by a counting circuit, when the access transmission times of the high bandwidth arbitration module or the low bandwidth arbitration module exceeds an preset value, the multiplexer is changed to receive the access request from another bandwidth arbitration module.

The computer arbitration system includes a plurality of downstream devices, a downstream device and a bandwidth allocation apparatus. The downstream devices output multiple access requests for data access, and they are classified into at least one high bandwidth downstream device group and at least one low bandwidth downstream device group according to a transmission speed. The downstream device is used for data access. The bandwidth allocation apparatus is used to allocate bandwidth from the downstream devices to the upstream direction. The bandwidth allocation apparatus includes a high bandwidth arbitration module, a low bandwidth arbitration module, a multiplexer and an output control switch. The high bandwidth arbitration module is used to select one downstream device from the high bandwidth downstream device group for allowing uplink. The low bandwidth arbitration module is used to select one downstream device from the low bandwidth downstream device group for allowing uplink. The multiplexer selects one of the access requests from the high bandwidth arbitration module or the low bandwidth arbitration module and uplinks the access request to an upstream device. The access transmission times of the high bandwidth arbitration module and the low bandwidth arbitration module are counted respectively by a counting circuit, when the access transmission times of the high bandwidth arbitration module or the low bandwidth arbitration module exceeds an preset value, the multiplexer is changed to receive the access request from another bandwidth arbitration module. The output control switch is electrically connected between the downstream devices and the bandwidth arbitration modules to determine whether allowing to transmit the access request from the downstream devices to the bandwidth arbitration modules.

The bandwidth allocation method of a computer arbitration system is used to arbitrate multiple access requests of a plurality of downstream devices to an upstream device. The bandwidth allocation method includes the following steps: classifying the downstream devices into at least one high bandwidth downstream device group and at least one low bandwidth downstream device group according to a transmission speed; selecting one access request from the multiple access requests of the downstream devices of the high bandwidth downstream device group corresponding to a high bandwidth arbitration module for allowing uplink; selecting one access request from the multiple access requests of the downstream devices of the low bandwidth downstream device group corresponding to a low bandwidth arbitration module for allowing uplink; counting access transmission times of the high bandwidth arbitration module; determining whether the access transmission times exceeds an preset value; changing to select the access request from the low bandwidth arbitration module for allowing uplink if the access transmission times exceeds the access transmission preset value.

The bandwidth allocation apparatus, the computer arbitration system and the bandwidth allocation method use arbitration algorithm to allocate bandwidth of the data transmission. It can balance equity and efficiency and allocate bandwidth reasonably and effectively. It also avoids some downstream devices unreasonably occupying the bandwidth and avoids affecting the smoothness in transmitting packets to improve the transmission efficiency.

DETAILED DESCRIPTION OF THE EMBODIMENTS

Figure 1:
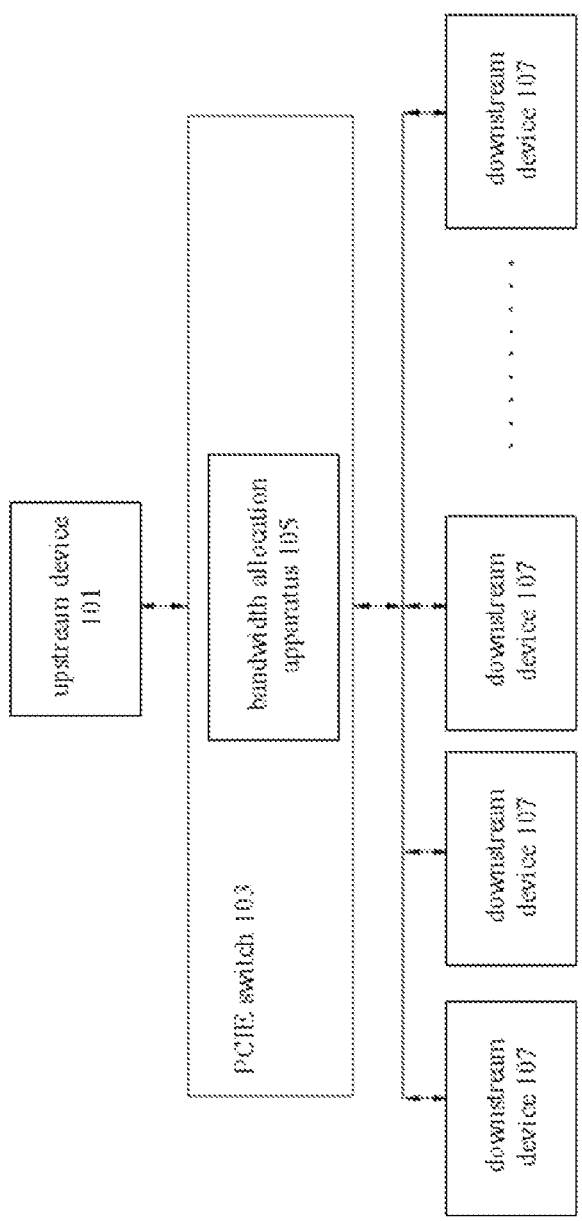
FIG. 1 is a schematic diagram showing a computer arbitration system in an embodiment.

FIG. 1 is a schematic diagram showing a computer arbitration system in an embodiment. The computer arbitration system includes a plurality of downstream devices 107. The downstream device 107 may be a serial advanced technology attachment (SATA) device, a display card or an ethernet network device. The downstream devices 107 may make access requests simultaneously to an upstream device 101 (such as a south bridge chip), and thus a bandwidth allocation apparatus 105 is needed to determine which downstream device can access the upstream device 101. In general, the access requests should be transmitted via a BUS, and the bus (not shown) is usually disposed between the PCIE switch 103 and the upstream device 101.

Figure 2:
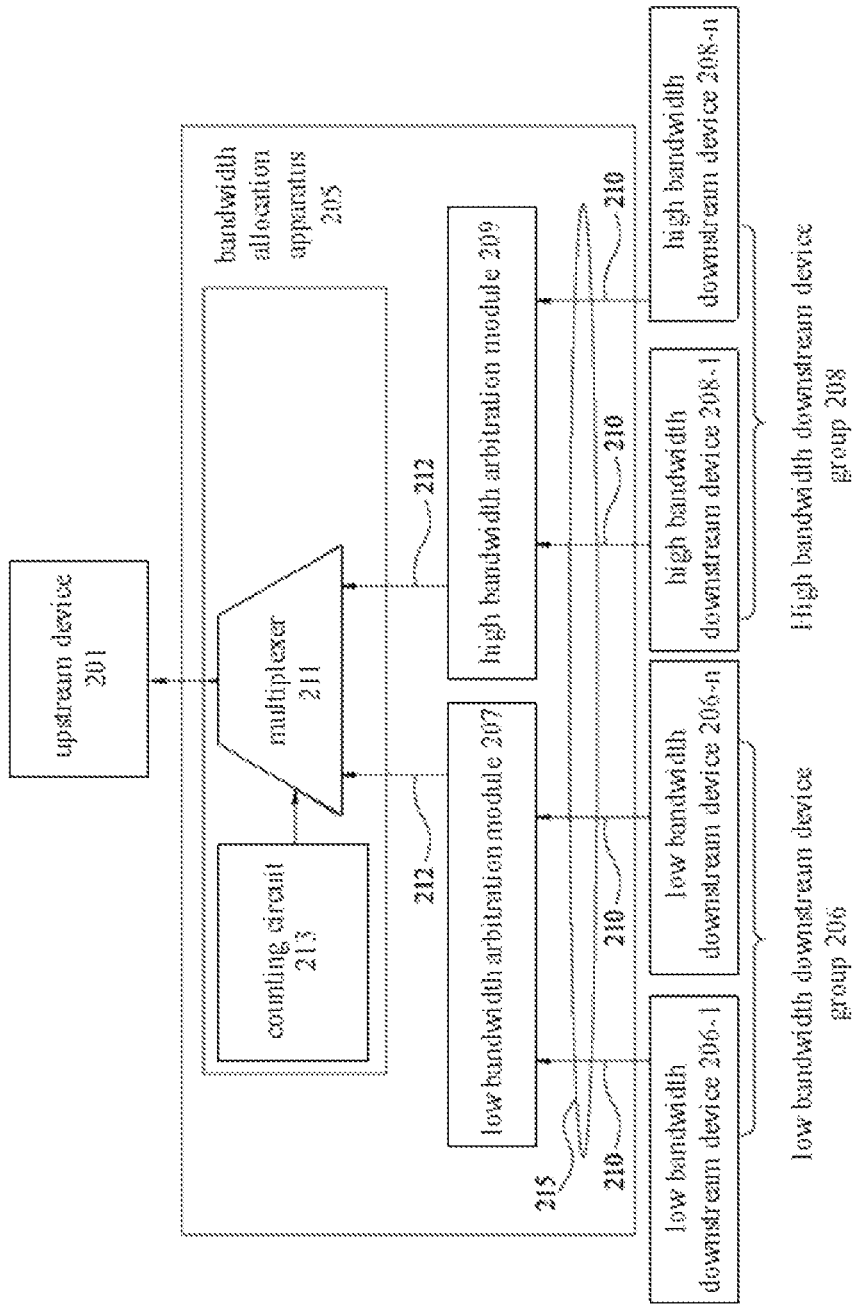
FIG. 2 is a block diagram showing a computer arbitration system in an embodiment.

FIG. 2 is a block diagram showing a computer arbitration system in an embodiment. The computer arbitration system includes a low bandwidth downstream device group 206 (low bandwidth downstream devices 206-1~206-n), a high bandwidth downstream device group 208 (high bandwidth downstream devices 208-1~208-n) which are classified according to as transmission speed, an upstream device 201 and a bandwidth allocation apparatus 205. The bandwidth allocation apparatus 205 is mainly applied to the PCIE switch which includes a high bandwidth arbitration module 209, a low bandwidth arbitration module 207, a multiplexer 211 and a counting circuit 213.

Data access transmission is performed between the low bandwidth downstream device group 206 and the upstream device 201 or between the high bandwidth downstream device group 20$ and the upstream device 201. The access and transmission may be writing data to the memory or reading data from the memory. The bandwidth arbitration module is classified into the high bandwidth arbitration module 209 and the low bandwidth arbitration module 207 to arbitrate access requests from the high bandwidth downstream device group 208 and the low bandwidth downstream device group 206, respectively. When the transmission speed of the low bandwidth downstream device group 206 or that of the high bandwidth downstream device group 208 is changed, the corresponding bandwidth arbitration module (the low bandwidth arbitration module 207 or high bandwidth arbitration module 209) is dynamically switched.

The low bandwidth arbitration module 207 selects one downstream device from the low bandwidth downstream devices 206-1~206-n corresponding to the low bandwidth downstream device group 206 for allowing uplink. The high bandwidth arbitration module 209 selects one downstream device from the high bandwidth downstream devices 208-1~208-n corresponding to the high bandwidth downstream device group 208 for allowing uplink. The low bandwidth arbitration module 207 and the high bandwidth arbitration module 209 may arbitrate the low bandwidth downstream device group 206 and the high bandwidth downstream device group 208 by a round robin arbitration method.

The round robin arbitration method is a fair arbitration architecture in a computer system. In a round robin arbitrator, the downstream devices obtain the access and transmission right sequentially. The downstream device that has obtained one access and transmission right can obtain the next access and transmission right after all other downstream devices have obtained the right. The access allocation method can assure that the low bandwidth downstream devices 206-1~206-n in the low bandwidth downstream device group 206 and the high bandwidth downstream devices 208-1~208-n in the high bandwidth downstream device group 208 have average probability to uplink. In addition, a first come first serve arbitration method can also be used for arbitration, the first come first serve arbitration method gives access right according to the order of the access requests.

The multiplexer 211 selects the access request from the low bandwidth arbitration module 207 or the high bandwidth arbitration module 209 to uplink to the upstream device 201, and priority and fairness should be considered in choosing the selection method. For example, the probability of selecting the access requests from the high bandwidth arbitration module 209 is higher than the probability of selecting the access requests from the low bandwidth arbitration module 207; or the high bandwidth arbitration module 209 has four times access rights while the low bandwidth access arbitration module 207 only have one access right, which is not limited herein.

The counting circuit 213 counts the access transmission times of the same bandwidth arbitration module, when the access transmission times exceeds an preset value, the multiplexer 211 is changed to receive the access request from another bandwidth arbitration module. For example, when the access transmission times of the low bandwidth arbitration module 207 exceed the preset value, the multiplexer is changed to the high bandwidth arbitration module 209. The preset value can be set by a configuration program, and the main consideration is that the probability of selecting the access requests from the high bandwidth arbitration module 209 is higher than the probability of selecting the access requests selected from the low bandwidth arbitration module 207. Consequently, the preset value of the high bandwidth arbitration module 209 is greater than the preset value of the low bandwidth arbitration module 207 to make the high bandwidth downstream device group 208 transmit data preferentially. However, the length of the data being written or read also needs be considered when setting the access transmission preset value, if the length of the data being written or read is too long, it needs to reduce the probability of selecting the access requests to avoid that this type of the downstream device occupies bandwidth for a long time.

The bandwidth allocation apparatus 205 further includes an output control switch 215 which is electrically connected between the low bandwidth downstream device group 206 and the low bandwidth arbitration module 207, and is also electrically connected between the high bandwidth downstream device group 208 and the high bandwidth arbitration module 209 to determine whether allowing to transmit the access request from the low bandwidth downstream devices 206-1~206-n to the low bandwidth arbitration module 207, or to transmit the access request from the high bandwidth downstream devices 208-1~206-n to the high bandwidth arbitration module 209. When the length of the data written or read by a same downstream device (such as one downstream device of the low bandwidth downstream device group 206 or the high bandwidth downstream device group 208) exceeds a limited length, the access request of the downstream device is rejected by the output control switch 215, and the rejection lasts for a certain time to give the bandwidth to other downstream devices for use. The lasting time of the rejection can be set by the configuration program.

Figure 3:
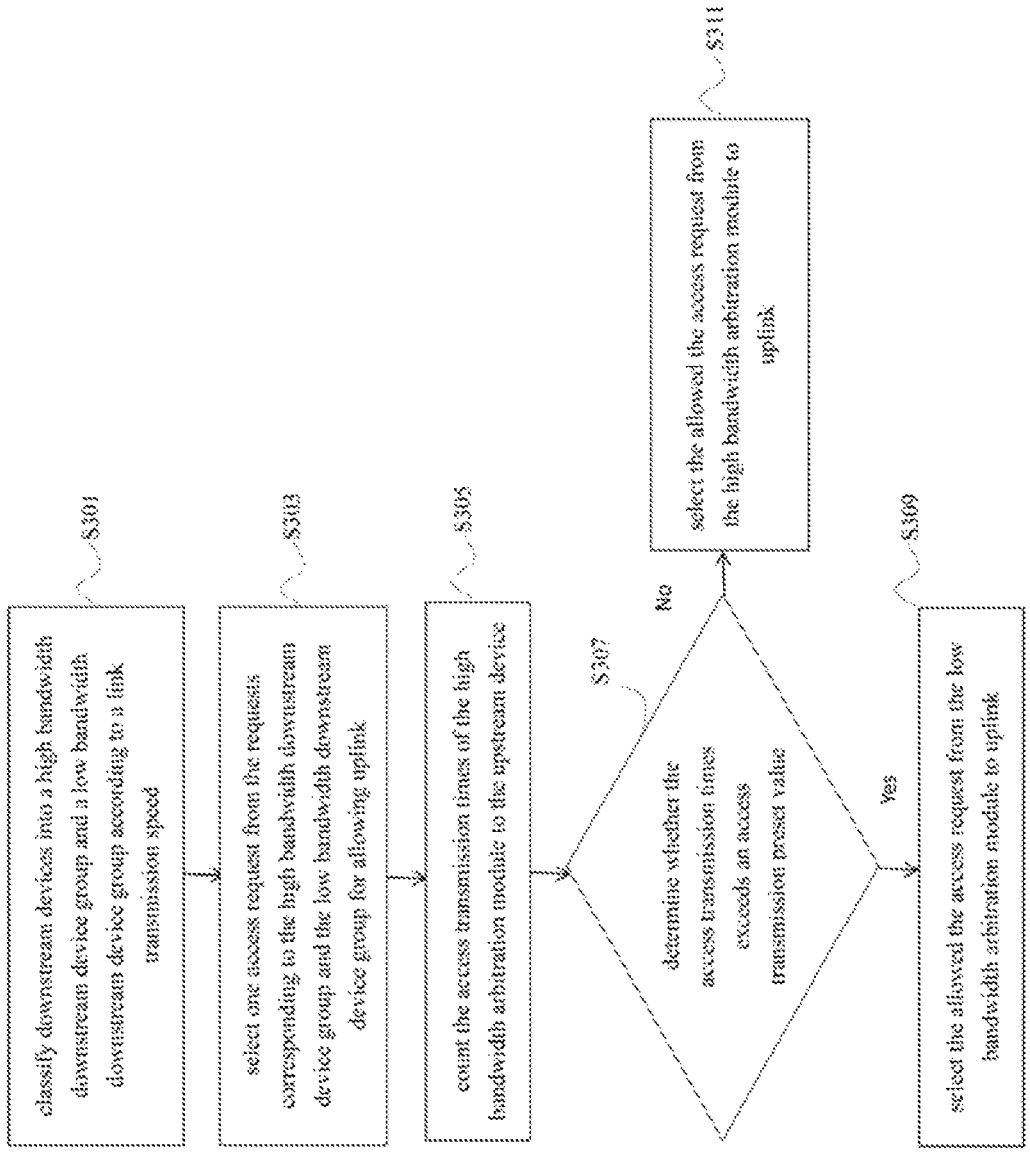
FIG. 3 is a flowchart showing a bandwidth allocation method in an embodiment.

FIG. 3 is a flowchart showing a bandwidth allocation method in an embodiment. The bandwidth allocation method is used to arbitrate multiple access requests of a plurality of downstream devices. First, classifying downstream devices into a high bandwidth downstream device group 208 and a low bandwidth downstream device group 206 according to a transmission speed (step 301); selecting one access request from the requests corresponding to the high bandwidth downstream device group 208 and the low bandwidth downstream device group 206 for allowing uplink (step 303), and the round robin arbitration method or the first come first serve arbitration method (described in the embodiment with FIG. 2) may be used as the selecting method, and the number of the selected access requests is the same as the number of the bandwidth downstream device groups. In an embodiment, the downstream devices is classified into two groups which are the high bandwidth downstream device group 208 and the low bandwidth downstream device group 206, and thus the number of the selected access requests is two, etc; counting the access transmission times from the high bandwidth arbitration module 209 to the upstream device 201 (step 305); determining whether the access transmission times exceeds a preset value (step 307); selecting the allowed access request from the low bandwidth arbitration module 207 to uplink if the access transmission times exceeds the preset value (step 309); selecting the allowed the access request from the high bandwidth arbitration module 209 to uplink if the access transmission times does not exceed the access transmission preset value (step 311).

According to a bandwidth allocation apparatus, a computer arbitration system, and a bandwidth allocation method in embodiment, the transmission speed of the downstream devices is considered in arbitrating the access requests from the downstream devices to the upstream, it avoids that downstream devices take up too much bandwidth which makes the high speed downstream device cannot be connected. Moreover, it also utilizes bandwidth allocation to avoid that the receive buffer of the upstream device is blocked because a specific downstream device outputs too many access requests to process and block the transmission of other downstream device. Therefore, the upstream device would not block the transmission at the upstream direction due to the requests which cannot be processed in time, and thus the overall transmission is smoother.

Although the present disclosure has been described in considerable detail with reference to certain preferred embodiments thereof, the disclosure is not for limiting the scope. Persons having ordinary skill in the art ma make various modifications and changes without departing from the scope. Therefore, the scope of the appended claims should not be limited to the description of the preferred embodiments described above.

What is claimed is:

1. A bandwidth allocation apparatus used to arbitrate multiple access requests from a plurality of downstream devices to an upstream direction, wherein the downstream devices are classified into at least one high bandwidth downstream device group and at least one low bandwidth downstream device group according to a transmission speed, the bandwidth allocation apparatus comprising:
   a high bandwidth arbitration module used to select one downstream device from the high bandwidth downstream device group for allowing uplink;
   a low bandwidth arbitration module used to select one downstream device from the low bandwidth downstream device group for allowing uplink; and
   a multiplexer used to select one of the access requests from the high bandwidth arbitration module or the low bandwidth arbitration module for allowing to uplink the access request to an upstream device,
   wherein access transmission times of the high bandwidth arbitration module and the low bandwidth arbitration module are counted respectively by a counting circuit, when the access transmission times of the high bandwidth arbitration module or the access transmission times of the low bandwidth arbitration module exceeds an preset value correspondingly, the multiplexer is changed to receive the access request from another bandwidth arbitration module.

2. The bandwidth allocation apparatus according to claim 1, wherein the probability of the multiplexer selecting the access request from the high bandwidth arbitration module is higher than the probability of the multiplexer selecting the access request from the low bandwidth arbitration module.

3. The bandwidth allocation apparatus according to claim 1, wherein the preset value of the access transmission times of the high bandwidth arbitration module is greater than the preset value of the access transmission times of the low bandwidth arbitration module.

4. The bandwidth allocation apparatus according to claim 1, wherein the bandwidth arbitration modules arbitrate the downstream devices by a round robin arbitration method.

5. The bandwidth allocation apparatus according to claim 1, further including an output control switch electrically connected between the downstream devices and the bandwidth arbitration modules to determine whether allowing to transmit the access request from the downstream devices to the bandwidth arbitration modules.

6. The bandwidth allocation apparatus according to claim 5, wherein if the length of data written or read by a downstream device exceeds a limited length, the access request from the downstream device is lasted.

7. A computer arbitration system, comprising:
   a plurality of downstream devices outputting multiple data access requests, wherein the downstream devices are classified into at least one high bandwidth downstream device group and at least one low bandwidth downstream device group according to a transmission speed;
   an upstream device used for data access; and
   a bandwidth allocation apparatus used to allocate transmission bandwidth from the downstream devices to the upstream direction, wherein the bandwidth allocation apparatus includes:
      a high bandwidth arbitration module used to select one downstream device from the high bandwidth downstream device group for allowing uplink;
      a low bandwidth arbitration module used to select one downstream device from the low bandwidth downstream device group for allowing uplink;
      a multiplexer used to select one of the access requests from the high bandwidth arbitration module or the low bandwidth arbitration module for allowing to uplink the access request to the upstream device,
      wherein access transmission times of the high bandwidth arbitration module and the low bandwidth arbitration module are counted respectively by a counting circuit, when the access transmission times of the high bandwidth arbitration module or the access transmission times of the low bandwidth arbitration module exceeds an preset value, the multiplexer is changed to receive the access request from another bandwidth arbitration module; and
      an output control switch electrically connected between the downstream devices and the bandwidth arbitration modules to determine whether allowing to transmit the access request from the downstream devices to the bandwidth arbitration modules.

8. A bandwidth allocation method applied to a computer arbitration system, used to arbitrate multiple access requests from a plurality of downstream devices to an upstream device, the bandwidth allocation method comprising:
- classifying the downstream devices into at least one high bandwidth downstream device group and at least one low bandwidth downstream device group according to a transmission speed;
- selecting one access request from the multiple access requests of the downstream devices of the high bandwidth downstream device group corresponding to a high bandwidth arbitration module for allowing uplink;
- selecting one access request from the multiple access requests of the downstream devices of the low bandwidth downstream device group corresponding to a low bandwidth arbitration module for allowing uplink;
- counting access transmission times of the high bandwidth arbitration module;
- determining whether the access transmission times exceeds an preset value; and
- changing to select the access request from the low bandwidth arbitration module to uplink if the access transmission times exceeds the preset value.

9. The bandwidth allocation method according to claim 8, wherein the bandwidth allocation method arbitrates the downstream devices by a round robin arbitration method.

10. The bandwidth allocation method according to claim 8, wherein if the length of data written or read by a downstream device exceeds a limited length, the access request from the downstream device is lasted.

* * * * *